United States Patent Office 2,874,480
Patented Feb. 24, 1959

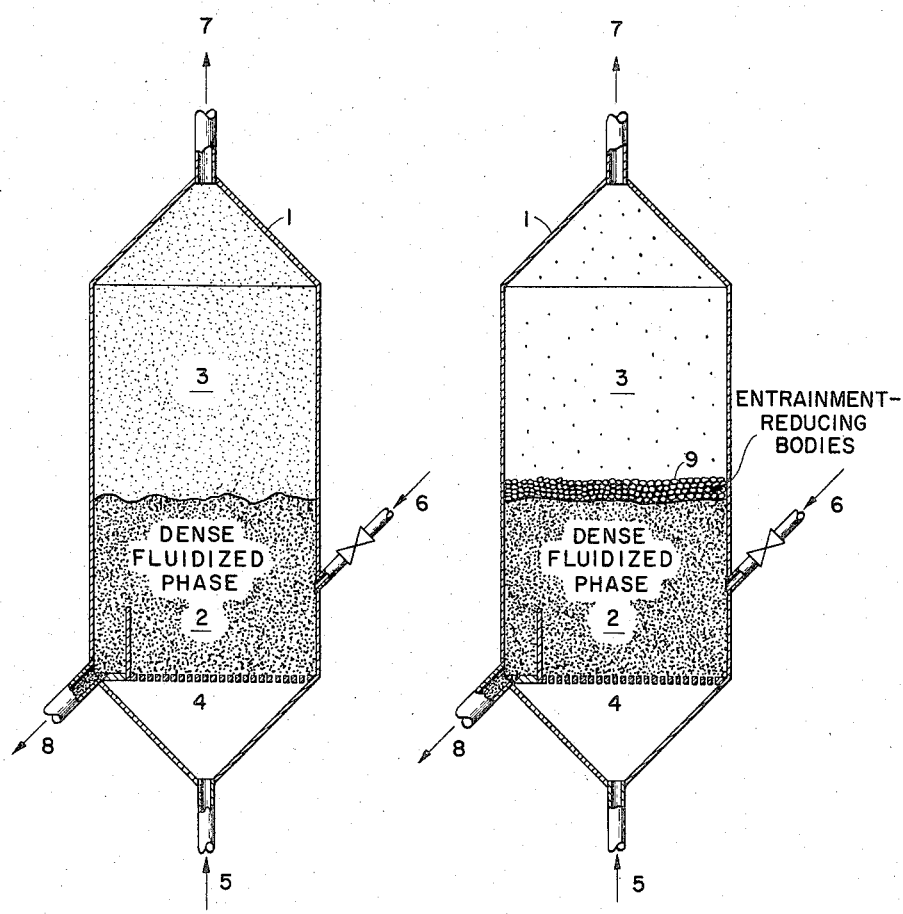

2,874,480

REDUCING ENTRAINMENT FROM FLUIDIZED BEDS

David B. Todd, El Cerrito, Calif., assignor to Shell Development Company, New York, N. Y., a corporation of Delaware Application November 12, 1957, Serial No. 695,534

5 Claims. (Cl. 34—10)

This invention relates to the art of fluidizing a mass of finely divided solid particles, such as catalyst powder, sand, coal, and the like, by flowing a gas therethrough, the term gas being used herein to include vapor. More particularly, it is concerned with the improvement of reducing the extrainment of the fluidized particles by the fluidizing gas which ascends from the top of the dense, turbulent fluidized bed into the low-density, dispersed-phase zone above it.

Fluidization of solids is used for various purposes. For example, in the catalytic cracking of hydrocarbons, catalyst powder consisting mainly of particles from about 20 to 150 microns in diameter, are brought into contact with hydrocarbon vapors at elevated temperature by flowing the vapors upwards through a bed of the catalyst in a reaction vessel to form therein a so-called dense fluidized bed in a turbulent state having, typically a density of 20–50 lbs. per cu. ft., of pseudo-liquid characteristics, including a defined upper level, resembling that of a vigorously boiling liquid, above which is a dispersed phase consisting mainly of vapor which emerges from the dense bed, the catalyst being withdrawn from a lower part of the vessel. Similarly, the withdrawn catalyst is treated in a regenerator, wherein the catalyst particles are maintained in a fluidized state by a stream of air. Fluidization is also employed in other fields, as in fluidized bed tubular heaters or coolers wherein sand in the fluidized state moves in contact with the tubes to impart or abstract heat therefrom, to fluidize finely divided coal for transporting the same or to effect treatment with a gas. Fluidization of the kind described above may also occur in the terminal disengagement chamber into which a dispersed or transport stream of solids is discharged.

A problem in such fluidized beds is that of withdrawing the fluidizing gas freed from the fluidized particles. While the bulk of the particles remain below the level of the dense bed, some are entrained by the gas which flows through the interface at the surface of the dense bed into the low-density zone above it and it is necessary to treat the gas in a separator to remove such entrained particles before discharging it, e. g., by flow through a cyclone and/or a filter. This is necessary not only to conserve the solids but also to avoid air pollution. Such devices are costly, require maintenance, and must often be employed in tandem to attain the required degree of solids removal; also, such separators are subject to erosion or clogging at a rate which would become lower if the quantity of entrained solids in the effluent gas were reduced.

It has heretofore been proposed to reduce the amount of solids entrainment in the effluent gas by providing baffles at the top of the dense bed, either in a fixed structure (U. S. Patent No. 2,455,561) or on a pontoon which floats on the bed (U. S. Patent No. 2,687,343). such devices, however, include special structures which involve capital and maintenance costs.

It is the object of the invention to reduce the quantity of solids entrainment from the surface of the dense bed without the use of baffles and similar mechanical structures, whereby the loading on the after-separators may be reduced and, in certain application, permitting the elimination of such after-separators.

The invention will be illustrated by the accompanying drawing, wherein:

Figure 1 is a vertical sectional view of a fluidization vessel operated according to the prior art, and Figure 2 is a similar view of the vessel operated according to the invention.

In summary, according to the invention entrainment of solids is reduced by maintaining at the interface between the dense bed and the dispersed phase, a layer of small, discrete solid bodies having densities less than the fluidized bulk density of the bed and diameters in excess of the diameters of fluidized particles. The solid bodies may be introduced into the fluidization chamber either separately or with the particles being fluidized; they may be replenished from time to time, either continuously or intermittently, as required to replace bodies which are lost due to being themselves carried off with the gas, e. g., after erosion, or withdrawn from the chamber with the fluidized particles.

To maintain the layer of entrainment reducing bodies and prevent their being carried off by the gas their relation to the fluidized particles must be such that $$d_e\sqrt{\rho_e} > d_f\sqrt{\rho_f}$$

wherein $d_e$ and $d_f$ are the diameters of the entrainment-reducing bodies and of the fluidized particles, respectively, and $\rho_e$ and $\rho_f$ are the specific gravities of these particles.

It is necessary for the maintenance of a layer at the interface that the entrainment-reducing bodies have a density, $\rho_e$, less than the apparent density of the fluidized bed, e. g., between about 0.2 and 0.95 of such density. By way of example, typical fluidized bed specific gravities may be between 0.28 and 0.85. All of these bodies may accumulate at the interface layer. It is, however, possible that because of overall solids mixing patterns that may be established in the dense fluidized bed that some of these bodies will be dispersed throughout the dense bed and discharged from the fluidization chamber along with the fluidized particles. Because the entrainment-reducing bodies are larger than the fluidized particles it is possible to effect a separation by physical means, such as screening. However, it is desirable that the bodies have diameters either small enough not to clog or large enough not to enter the valve and flow ducts through which the fluidized particles must flow.

To prevent the entrainment-reducing layer from being itself carried off by the gas it is necessary that the solid bodies thereof have diameters in excess of the diameters of the fluidized particles, as is apparent from the above inequality. It is preferred to use bodies having diameters between ten and seven-hundred times the maximum diameter of the fluidized particles, but even larger bodies can be used.

The quantity of the entrainment-reducing material should be sufficient to form over the entire interface a layer having a depth of at least twice the diameter of the solid bodies, and thicker layers, more than twice the stated minimum being preferred.

As entrainment-reducing bodies a variety of low-density materials may be used, having regard to the abrasion and temperature conditions prevailing in the fluidized bed. For example, in certain low-temperature applications it was found that comminuted cork is an excellent material. When higher temperatures are encountered balls or pellets of carbon black or highly porous refractory material, such as silica gel, diatomaceous earth or alumina may be used; these bodies may be coated with a suitable material, such as a coating of an epoxy resin or silicone either alone or together with an alkyd resin, or a vitreous coating, to afford greater resistance against abrasion and erosion. Hollow metal or plastic spheres having imperforate walls may also be used.

It was found that solid bodies as described above form a layer at the surface of the dense fluidized bed which is highly effective in reducing the amount of entrainment of the fluidized particles, to the extent that the load on the after-separator is reduced and the latter may be wholly or partly eliminated. For example, it is possible to pass the effluent gas through only a single-stage cyclone in installations where previously two stages were necessary. Also, the invention may be applied as a temporary expedient to permit operation of a fluidized bed unit after its cyclone has become worn to the extent that its separating efficiency is below the level normally necessary for continued operation without undue loss of solids or air pollution.

In Figures 1 and 2 there is shown a fluidization vessel 1 containing a dense fluidized phase 2 from which gas emerges to form a disperse phase 3 containing entrained solids. The vessel is provided with a gas-distributing grid 4. Fluidizing gas enters via a pipe 5. Solids may be admitted through an inlet pipe 6 and the gas discharged through an outlet pipe 7. Solids from the dense phase are withdrawn through a pipe 8.

In Figure 2, which shows the operation according to the invention, a layer of entrainment-reducing bodies 9 collects at the upper surface of the dense fluidized phase. With these bodies the amount of solid particles in the disperse phase 3 is less than in the prior art practice, shown in Figure 1.

When the entrainment-reducing bodies are depleted by being carried off by the gas following abrasion and/or by withdrawal together with the fluidized particles in cases where the bodies have relatively high densities, they are replaced to maintain the required inventory of the bodies in the fluidization chamber.

*Example*

In a small-scale fluidized bed using micro-spheroidal silica-alumina regenerated catalyst consisting of particles having diameters between 20 and 120 microns and a median diameter of about 70 microns and an apparent particle specific gravity of about 1.4, air at room temperature was passed upwards at a velocity of 0.9 ft. per sec., producing a dense fluidized bed having a specific gravity of 0.64. Cork cubes with one-eighth inch edges, having an apparent specific gravity of 0.24, were added in sufficient quantity to form a layer extending over the fluidized bed surface to a depth of three-quarters inch. The amount of catalyst entrained by the air was reduced by one-half from the amount entrained without the cork cubes.

I claim as my invention:

1. In the method of fluidizing a multitude of finely divided solid particles with a gas which comprises introducing the finely divided particles in a fluidization chamber, passing the gas upwards through the said particles at a velocity which maintains within the chamber two distinct zones, said zones being a lower, dense phase of pseudo-liquid characteristics and an upper, dispersed phase, and withdrawing the gas from said upper zone, the improvement which comprises maintaining at the interface between said lower and upper zones a layer of small, discrete, entrainment-reducing bodies having specific gravities less than the specific gravity of the said dense phase and diameters greater than those of said particles, in accordance with the relation $$d_e\sqrt{\rho_e} > d_f\sqrt{\rho_f}$$

wherein $d$ and $\rho$ are the diameters and specific gravities, respectively, and the subscripts $e$ and $f$ denote the entrainment reducing bodies and the fluidized particles, respectively.

2. Method according to claim 1 wherein said entrainment-preventing bodies have an apparent specific gravity between about 0.2 and 0.95 of the specific gravity of said lower, dense phase.

3. Method according to claim 1 wherein said entrainment-reducing bodies have diameters between about ten and seven-hundred times the diameters of the fluidized particles.

4. Method according to claim 3 wherein said entrainment-reducing bodies have an apparent specific gravity between about 0.2 and 0.95 of the specific gravity of said lower, dense phase and the said layer has a depth at least twice the diameters of said bodies.

5. Method according to claim 1 wherein said entrainment-reducing bodies are also dispersed within said lower, dense phase, in combination with the steps of continuously withdrawing a mixture of said fluidized particles and the said bodies from said lower phase, continuously introducing additional particles to the chamber for fluidization, and replenishing the entrainment-reducing bodies.

References Cited in the file of this patent

UNITED STATES PATENTS

| | | |
|---|---|---|
| 2,483,485 | Barr | Oct. 4, 1949 |
| 2,561,396 | Matheson | July 24, 1951 |
| 2,733,193 | Haensel | Jan. 31, 1956 |
| 2,774,661 | White | Dec. 18, 1956 |